(12) United States Patent
Dennison et al.

(10) Patent No.: US 8,243,744 B2
(45) Date of Patent: Aug. 14, 2012

(54) PRIORITY SORTING

(75) Inventors: Larry R. Dennison, Walpole, MA (US);
Derek Chiou, Rollingwood, TX (US)

(73) Assignee: FutureWei Technologies, Inc., Plano, TX (US)

(*) Notice: Subject to any disclaimer, the term of this patent is extended or adjusted under 35 U.S.C. 154(b) by 1050 days.

(21) Appl. No.: 11/070,865

(22) Filed: Mar. 1, 2005

(65) Prior Publication Data

US 2005/0201402 A1 Sep. 15, 2005

Related U.S. Application Data

(63) Continuation-in-part of application No. 11/068,732, filed on Feb. 28, 2005, now abandoned.

(60) Provisional application No. 60/549,085, filed on Mar. 1, 2004.

(51) Int. Cl.
*H04L 12/28* (2006.01)
*H04L 12/56* (2006.01)

(52) U.S. Cl. ........................ 370/412; 370/449

(58) Field of Classification Search .................. None
See application file for complete search history.

(56) References Cited

U.S. PATENT DOCUMENTS

| 5,168,570 | A * | 12/1992 | Eckert et al. | 710/241 |
|---|---|---|---|---|
| 6,292,934 | B1 * | 9/2001 | Davidson et al. | 717/158 |
| 6,343,072 | B1 * | 1/2002 | Bechtolsheim et al. | 370/351 |
| 6,700,809 | B1 * | 3/2004 | Ng et al. | 365/49.1 |
| 6,704,860 | B1 * | 3/2004 | Moore | 712/237 |
| 6,791,990 | B1 * | 9/2004 | Collins et al. | 370/412 |
| 6,876,559 | B1 * | 4/2005 | Rathnavelu et al. | 365/49.1 |
| 6,934,796 | B1 * | 8/2005 | Pereira et al. | 711/108 |
| 7,188,211 | B2 * | 3/2007 | Roth et al. | 711/108 |
| 7,193,874 | B1 * | 3/2007 | Pereira et al. | 365/189.15 |
| 7,382,637 | B1 * | 6/2008 | Rathnavelu et al. | 365/49.17 |
| 2001/0043610 | A1 * | 11/2001 | Nemirovsky et al. | 370/412 |
| 2003/0018863 | A1 * | 1/2003 | Hill et al. | 711/158 |
| 2003/0058878 | A1 * | 3/2003 | Minnick et al. | 370/412 |
| 2003/0118044 | A1 * | 6/2003 | Blanc et al. | 370/414 |
| 2003/0163671 | A1 * | 8/2003 | Gschwind et al. | 712/214 |
| 2004/0015882 | A1 * | 1/2004 | Peter Tang | 717/129 |
| 2004/0095948 | A1 * | 5/2004 | Lin | 370/412 |
| 2004/0193741 | A1 * | 9/2004 | Pereira et al. | 710/1 |
| 2004/0213156 | A1 * | 10/2004 | Smallwood et al. | 370/232 |
| 2004/0268308 | A1 * | 12/2004 | Srivastava et al. | 717/120 |
| 2005/0001744 | A1 * | 1/2005 | Roth et al. | 341/50 |
| 2005/0102460 | A1 * | 5/2005 | Wahler | 710/269 |
| 2006/0280193 | A1 * | 12/2006 | Srinivasan et al. | 370/411 |

OTHER PUBLICATIONS

Knuth, D., *The Art of Computer Programming*, vol. 3: Sorting and Searching, Chapter 6.4, Addison Wesley, 1973.
Fox, E., et al., "Practical Minimal Perfect Hash Functions for Large Databases," *Communications of the ACM* 35, 1 (Jan. 1992), pp. 105-121.

* cited by examiner

*Primary Examiner* — Gregory Sefcheck
*Assistant Examiner* — Suk Jin Kang
(74) *Attorney, Agent, or Firm* — Hamilton, Brook, Smith & Reynolds, P.C.

(57) ABSTRACT

Sort elements, such as queues processed in a network processor, are provided with relative priorities relative to each other. A set of relative priorities is used to specify priority order of the sort elements. The priority order may be specified by addressing code in a jump table. Duplicate code in the jump table having multiple entrance points allows for reduction of the size of the jump table. The relative priorities may be applied to a lookup table, hash or other function in order to address the jump table.

19 Claims, 5 Drawing Sheets

|   | 1 | 2 | 3 |
|---|---|---|---|
| 1 | = |   |   |
| 2 | < | = |   |
| 3 | >= | >= | = |

A Three Queue Sorting Matrix

FIG. 4

PRIORITY SORTING

RELATED APPLICATIONS

This application is a continuation-in-part of U.S. application Ser. No. 11/068,732 entitled "Efficient Jump Tables" filed Feb. 28, 2005 now abandoned under which claims the benefit of U.S. Provisional Application No. 60/549,085, filed on Mar. 1, 2004. The entire teachings of the above applications are incorporated herein by reference.

BACKGROUND OF THE INVENTION

Polling a set of resources in a specific order and processing the first one found to have something to process is a common operation in networking and other fields. The order of polling can be defined by a priority list that orders the set of resources by some criteria. If the state of one of the resources changes, such as when the polling of queues discovers a packet in one of those queues that is then forwarded, the priority of that resource could change with respect to the other resources. Thus, after a polling round completes, the priority list may need to be reordered.

One networking application of this operation is a weighted fair queuing (WFQ) arbitrator that decides which queue of packets gets to send the next packet. Once a queue sends a packet, its priority is adjusted, the priority list is re-sorted and the re-sorted priority list is used in the next round. Thus, at most one queue changes its priority in each iteration. Even though a queue is the top priority, it may not have a packet to send, potentially requiring all the queues to be polled in priority order.

There are many ways to implement this operation. One naïve approach is to keep a priority for each queue in a dense array that we will call the priority queue, do a complete sort of the priority queue based on the relative weight of each queue after each iteration where relative weights may have changed and poll the queues in the priority order. The sort itself is expensive, requiring $O(N \log(N))$ (where N is the number of queues) comparison/swap operations. In addition, such a sort is difficult to implement efficiently on processors with high branch penalties. Certain processors have high branch penalties, that is, they take more time to perform branches than other instructions. In such processors, it may actually save time to use more non-branch instructions rather than fewer branch instructions. Traditional sorting methods potentially require as many branches as comparisons, that is $O(N\lg(N))$ for a full sort and at least $O(\lg(N))$ to do an insertion of a single element that has changed. Once the priority queue is sorted, it is traversed from highest priority to lowest priority, where each queue is polled in the order specified by the priority queue. The first queue that has a packet to send gets to send that packet and then has its weight appropriately adjusted. The process then repeats.

One implementation of this scheme has each element in the priority queue contain two values, a queue number and its relative weight. The priority queue is sorted on the relative weight and the queue number is moved along with the relative weight during the sort. Once the sort is complete, the priority queue contains a sorted list of queues and their relative weights, where the first element names the highest priority queue, the second element names the second highest priority queue and so on.

Another naïve queue polling approach uses a queue weight array instead of a priority queue. That queue weight array contains the relative weight for each of the queues, but not in sorted order. Thus, the first element contains the relative weight for queue 1, the second element contains the relative weight for queue 2 and so on. Using this queue weight array, one can scan the entire array looking for the highest priority queue. Once the highest priority queue is found, that queue is polled. If a packet is found, the packet is forwarded and the relative weight for the queue is adjusted. If a packet is not found in the highest priority queue, the queue weight array is scanned for the next highest priority queue and so on. This scheme is simple, but takes $O(N^2)$ operations to complete (N scans of N queues.) This approach is too slow for high performance applications.

There are many ways to implement this operation. One naïve approach to keep a priority for each queue in a dense array that we will call the priority queue, do a complete sort of the priority queue based on the relative weight of each queue after each iteration where relative weights may have changed and poll the queues in the priority order. The sort itself is expensive, requiring $O(N \log(N))$ (where N is the number of queues) comparison/swap operations. In addition, such a sort is difficult to implement efficiently on processors with high branch penalties. Certain processors have high branch penalties; that is, they take more time to perform branches than other instructions. In such processors, it may actually save time to use more non-branch instructions rather than fewer branch instructions. Traditional sorting methods potentially require as many branches as comparisons, that is $O(N\lg(N))$ for a full sort and at least $O(\lg(N))$ to do an insertion of a single element that has changed.

Once the priority order has been determined, the queues must be polled in the appropriate priority order. Jump tables are a time-efficient method to do polling. Rather than implement a loop that, using the priority list, successively determines the next queue to poll and polls that queue, a jump table implementation would jump to a piece of code that polls in the correct order without branching to determine the next thing to branch. For example, take a system with three queues that need to be polled in some priority order that periodically changes based on some criteria. There are only six possible priority orders to poll the queues: [1, 2, 3], [1, 3, 2], [2, 1, 3], [2, 3, 1], [3, 1, 2], [3, 2, 1]. A jump table that encapsulated that knowledge might look like the following code:

```
Order_1_2_3:
    Poll queue 1. If packet available forward and return
    Poll queue 2. If packet available forward and return
    Poll queue 3. If packet available forward and return
    Return
Order_1_3_2:
    Poll queue 1. If packet available forward and return
    Poll queue 3. If packet available forward and return
    Poll queue 2. If packet available forward and return
    Return
Order_2_1_3:
    Poll queue 2. If packet available forward and return
    Poll queue 1. If packet available forward and return
    Poll queue 3. If packet available forward and return
    Return
Order_2_3_1:
    Poll queue 2. If packet available forward and return
    Poll queue 3. If packet available forward and return
    Poll queue 1. If packet available forward and return
    Return
Order_3_1_2:
    Poll queue 3. If packet available forward and return
    Poll queue 1. If packet available forward and return
    Poll queue 2. If packet available forward and return
    Return
```

```
Order_3_2_1:
    Poll queue 3. If packet available forward and return
    Poll queue 2. If packet available forward and return
    Poll queue 1. If packet available forward and return
    Return
```

Thus, at least one instance of every possible polling order is present in the jump table. In this case, there are six code strips, each encoding the necessary operations to perform one polling operation of a fixed queue priority order. Jump tables eliminate the control required by more traditional loop-based priority polling that would loop through each of the entries in the priority queue and would then require at least one conditional per loop iteration to branch back to the start of the loop. A jump table requires exactly one branch, that is, to the code strip that will execute the polls in the correct order. Of course, each poll requires a branch, but that is also true for a traditional loop-based scheme.

Jump tables applied to processing in priority order, however, have their inefficiencies as well. Assume that we have a sorted priority queue. How do we go from that queue to the appropriate jump table entry point?

Perhaps the simplest method is to compute an index from the sorted priority queue by using the queue numbers as digits in a base N number, where N is the number of queues. For example, in a three queue system, a priority queue might specify the priority order 2, 1, 3 (represented as 1, 0, 2 to be 0 offset). A unique index can be generated as follows:

$$1N^2 + 0N^1 + 2N^0$$

Where N is 3, the number of queues. This method will generate a unique integer that will uniquely identify the priority order of the three queues. However, this method creates a number that is $N^N$ in range, and thus much larger than the N! required range to represent all possible permutations of N queues.

Thus, when using this technique to jump into a jump table, there is complexity in determining where to jump. Traditionally, a jump table is an array that is addressed with an integer. The addressed entry contains an address to jump to. If the integer range used to select a jump table entry point is contiguous and small, simple arithmetic operations or a simple lookup can be performed to generate the entry point address. In this case, since the integer range used is non-contiguous and large, the appropriate entry point cannot, in general, be simply computed from the integer; more complex operations such as a tree of branches are generally used instead.

SUMMARY OF THE INVENTION

In jump table embodiments, this invention addresses these problems by efficiently creating the correct index into a space-efficient jump table that polls in the correct order for each polling iteration. Jump table embodiments of the invention may comprise a few independent parts. The first part performs the priority sort using a novel sorting array that eliminates the need for branches in most processors, replacing the branches with (N−1) comparisons, generating an address with the results of those and previous comparisons and using that address or a transform of that address to perform at least one hash or lookup into a lookup table to read the jump table index. The second part takes advantage of the fact that all queues must be polled and thus allows the jump table to be collapsed by a factor of N by increasing the number of polls within a table entry from N to 2N−1 and allowing jumps to a mid-point within the table.

More generally, relative priority of each sort element, such as a queue, relative to each other sort element is maintained. The relative priorities may, for example, be maintained in a sorting matrix. With change in a sort element, relative priority of that changed sort element is revised relative to other sort elements. The relative priorities are used to specify priority order of the sort elements.

A processor may comprise memory that maintains relative priority of each sort element relative to each other sort element. A priority processor stores in memory the relative priority of the changed sort element relative to each other sort element. A function, such as a lookup table or hash function or combination thereof, specifies a priority order of the sort elements based on the relative priorities.

A priority order may be specified by addressing code that processes the sort elements in the priority order. The code may be addressed by the relative priorities through a lookup table, hash function or other function. Preferably, the code is free of branches. The code may comprise code blocks that process sort elements in a priority order and duplicate code that processes select ones of the sort elements, and each of multiple entry points in a code block is specified by a set of relative priorities.

In the case of a lookup table, the relative priorities may be hashed with the results of the hash being used to address the lookup table. The lookup table or other function may be addressed by less than all of the relative priorities, and the output of the lookup table or other function and additional relative priorities are further processed to address the code.

Where the sort elements are queues, the priorities may be based on queue size, either directly or through a function.

A network device embodying the invention may include a plurality of queues in memory that maintains relative priority of each queue relative to each other queue.

This invention is very general and not specific to queuing problems but is applicable to any problem that changes priorities and then takes specific actions in the order specified by the new set of priorities.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a sorting matrix showing priority 6, 4, 3, 1, 2, 5;

FIG. 2 shows entries that need to be computed if queue 3's priority changes;

FIG. 4 illustrates a sorted matrix for a simple 3 queue instance.

DETAILED DESCRIPTION OF THE INVENTION

A description of preferred embodiments of the invention follows.

The invention is best illustrated with an example. Consider a six-queue WFQ system. The sorted priority order can be represented by a diagonal half of a two dimensional, N×N matrix, where each matrix entry indicates whether the priority of the Y dimension queue is lower than the X dimension queue. Each entry in the matrix is called a relative priority.

Figures 1, 2:
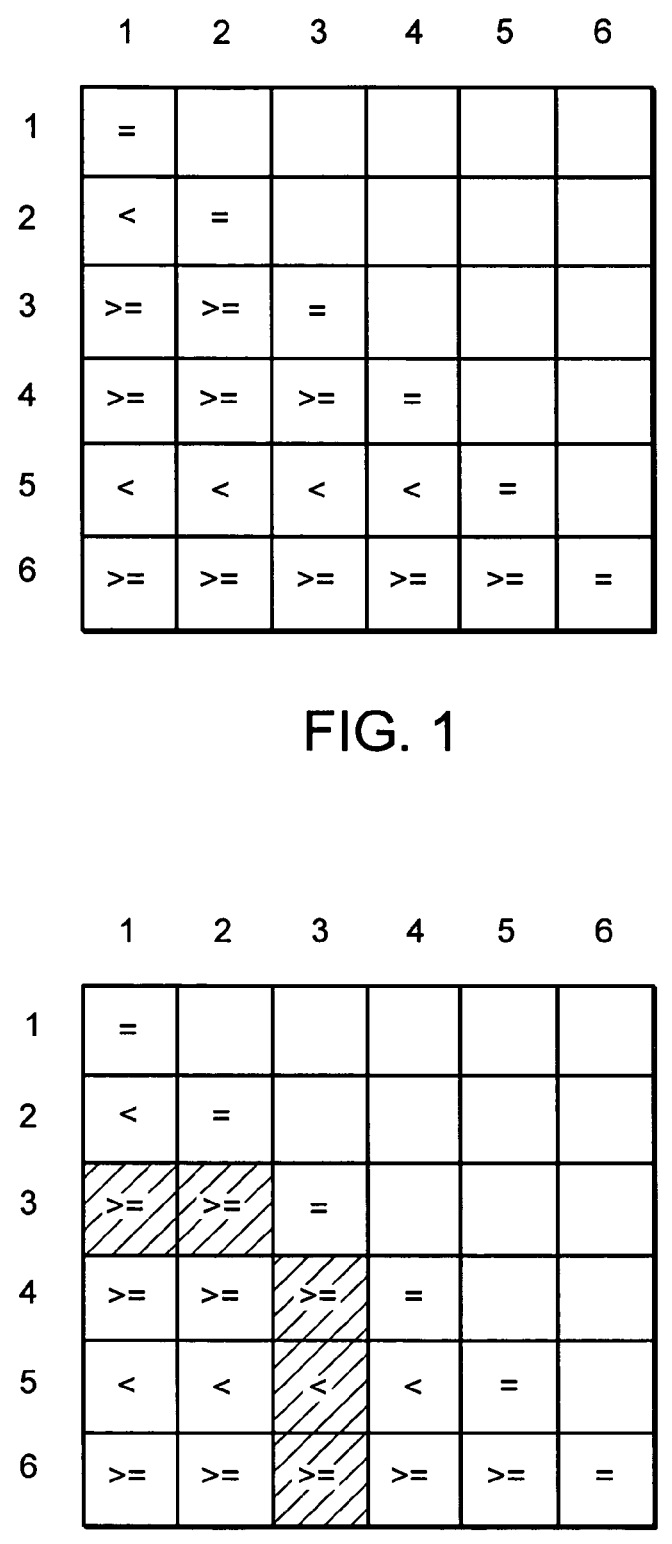

For example, the matrix in FIG. 1 encodes a priority order of 6, 4, 3, 1, 2, 5.

When a single queue's priority changes, only N−1 of the relative priority entries (where either the row or the column represents that queue) need to be recomputed. For example, if queue 3 changed its priority, only the entries shown in gray in FIG. 2 need to be recomputed. That recomputation potentially does not require any branches; instead it is a straight comparison, the result of which is written into the appropriate entry.

Relative priorities could be as simple as making deeper queues higher priority than shallower queues. In that case, the depth of each queue would be compared to the depth of the queue that was just serviced and the resulting relative priorities written to the matrix. Other methods to determine if one queue was higher priority than another can obviously be used, with the result being written to the appropriate entry in the sorting matrix. Other methods might include a rotating priority, where the last queue that was serviced is then the lowest priority (which can be achieved with no comparisons by simply setting the appropriate entries with the appropriate value), a probabilistic priority, where the last queue that was serviced is assigned a randomly generated number that is then compared against all of the other queues randomly generated numbers, etc.

The values in the matrix represent a priority encoding of the queues. An address is created by concatenating the bit values in the sorting table in a set order, of which there are $(N^2-N)/2$. Thus, in the example given, we have a 15 b (bit) address. Assuming a less than (<) is a 0 and a greater than or equal (>=) is a 1, the address becomes 011011101101011 In this case, we traverse the columns from the top down, from the left to the right. This is one canonical order; others are just as valid as long as the order is consistent. This address uniquely represents a particular priority order of the six queues; any difference in the bits would result in a different priority order (or an illegal sorting matrix). The address is used to read a lookup table where we have pre-stored an index into the jump table. Note that the size of that lookup table $(2^{((N^2-N)/2)})$ is substantially larger than the number of polling permutations, but since the table will likely sit in external memory the size may be tolerable.

Figure 3:
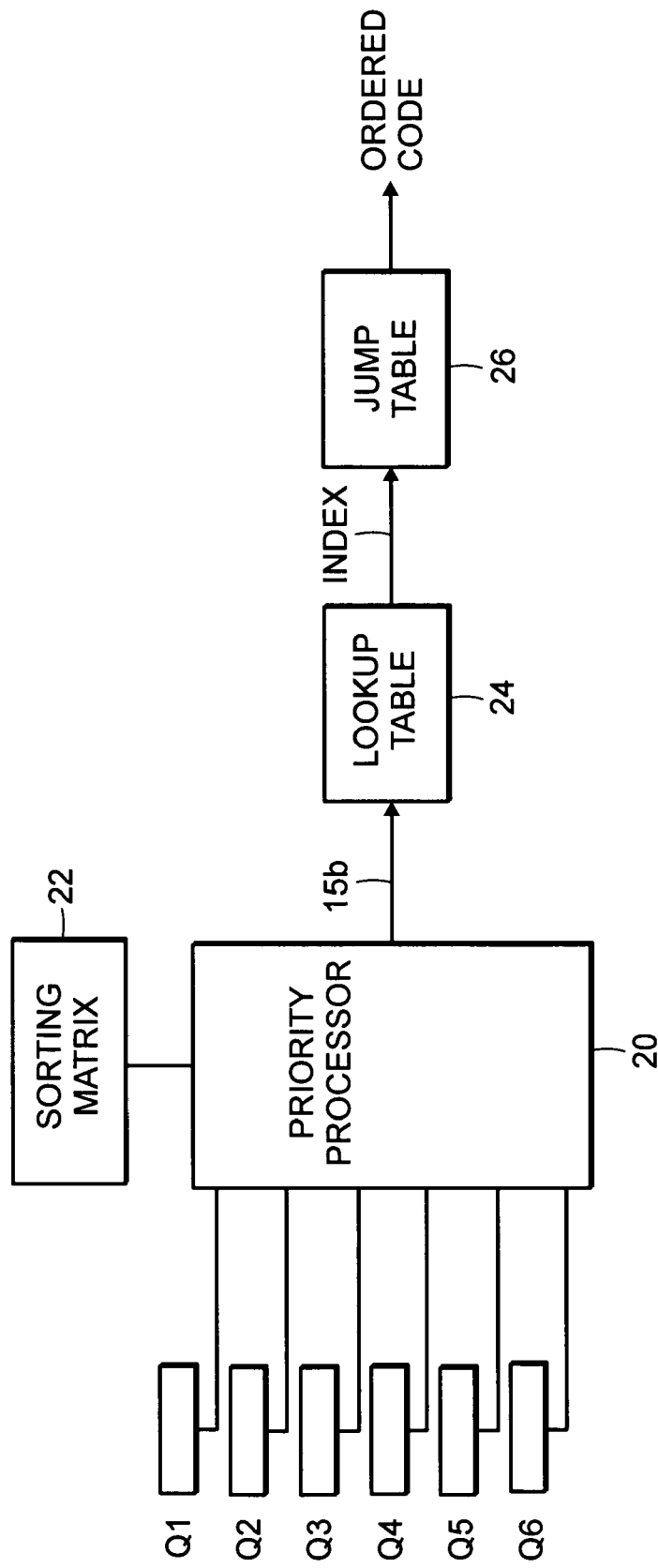
FIG. 3 illustrates one embodiment of the invention.

An illustration of the above described embodiment is presented in FIG. 3. A priority processor, which may be a networking processor in an internet router, monitors queues Q1-Q6. With any change in a queue that might affect its priority, the priority processor makes the necessary comparisons with each other queue and updates the sorting matrix 22. For example, where there is a change in Q3 the comparisons illustrated by shading in FIG. 2 are made and changes in those entries in the sorting matrix are made as appropriate. To then poll the six queues in the appropriate priority order, the 15 bit address generated from the entries of the sorting matrix is applied to a lookup table 24 which provides the appropriate index into a jump table 26. The index into the jump table identifies a block of code that polls each queue in the indicated priority order without the need for branches. The ordered code of the indexed code block is then processed in the network processor.

Figure 4:
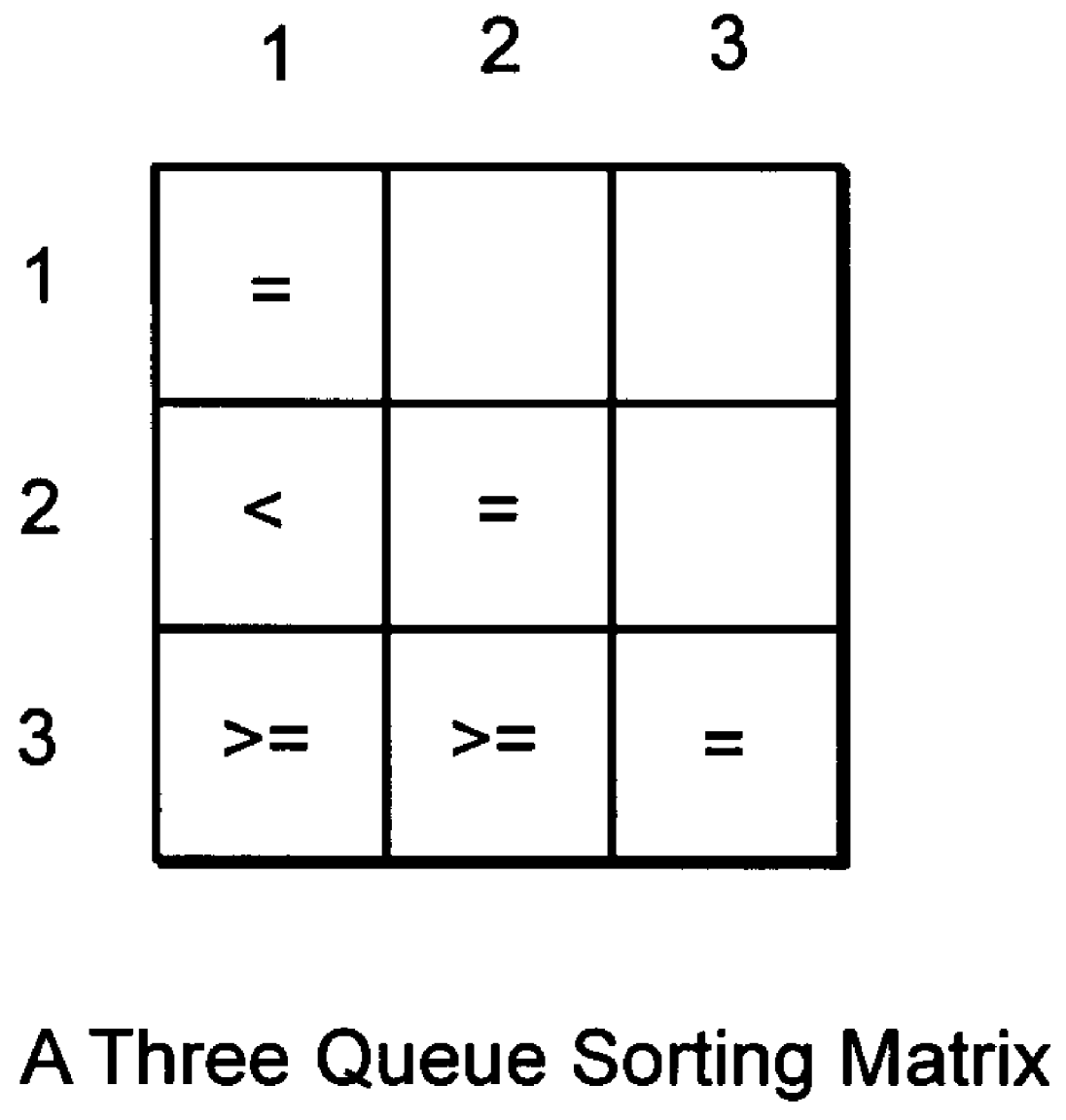

Not all addresses generated directly from the sorting matrix are valid. Intuitively, we can see that there are $2^{((N^2-N)/2)}$ values represented by the sorting matrix, but only N! possible permutations. Thus, many of the possible addresses are illegal. To illustrate, consider a three queue instance of the sorting matrix shown in FIG. 4. The priority order specified, [3, 1, 2] represented by the address 011, is a consistent address. However, the address 010, indicates that (2<1) && (3>=1) && (3<2) which is illegal by the mathematical transitive property. 2 cannot be smaller than 1 while 3 is greater than or equal to 1 and 3 is smaller than 2. That equation is internally inconsistent and thus illegal. The address 010 should never occur. In such a small example, there are only two illegal addresses out of eight possible addresses. However, in a larger system with 6 queues, for example, the number of addresses is 32768 while the number of legal addresses is 720. Thus, there is a tremendous amount of wasted space. Thus, the address space is very sparsely populated with valid data. Continuing this example, the simplest way to transform the large address into one of the 720 real possibilities is to do a lookup into an appropriately populated lookup table using the 15 bits as an address. Only 720 of those addresses will have a valid entry in the lookup table; the rest should never be accessed. The data associated with each of the valid addresses is a representation of one of the 720 possible priority orders. One such representation is the appropriate entry point into a jump table that contains a code strip to poll the queues in the correct priority order.

The simple approach of using the unmodified address to point to a representation of one of the possible priority orders is wasteful of memory. One can apply traditional techniques to the new sorting matrix to minimize the size of the lookup table or eliminate the lookup table altogether. One such technique is hashing the address to produce the real address (see Knuth, D. *The Art of Computer Programming*, Volume 3: Sorting and Searching, Chapter 6.4. Addison Wesley, 1973.) Since we know all possible addresses, a "perfect" hash function can be mechanically generated (see Fox, E., Heath, L., Chen, Q., and Daoud, A. Practical Minimal Perfect Hash Functions for Large Databases. *Communications of the ACM* 35,1 (January 1992) 105-121) which will map the address space to a minimal-sized lookup table (exactly the number of possible priority orders.) The perfect hash function may be deemed too expensive to compute in which case a less optimal hash function that uses a larger lookup table can be selected.

Figure 5:
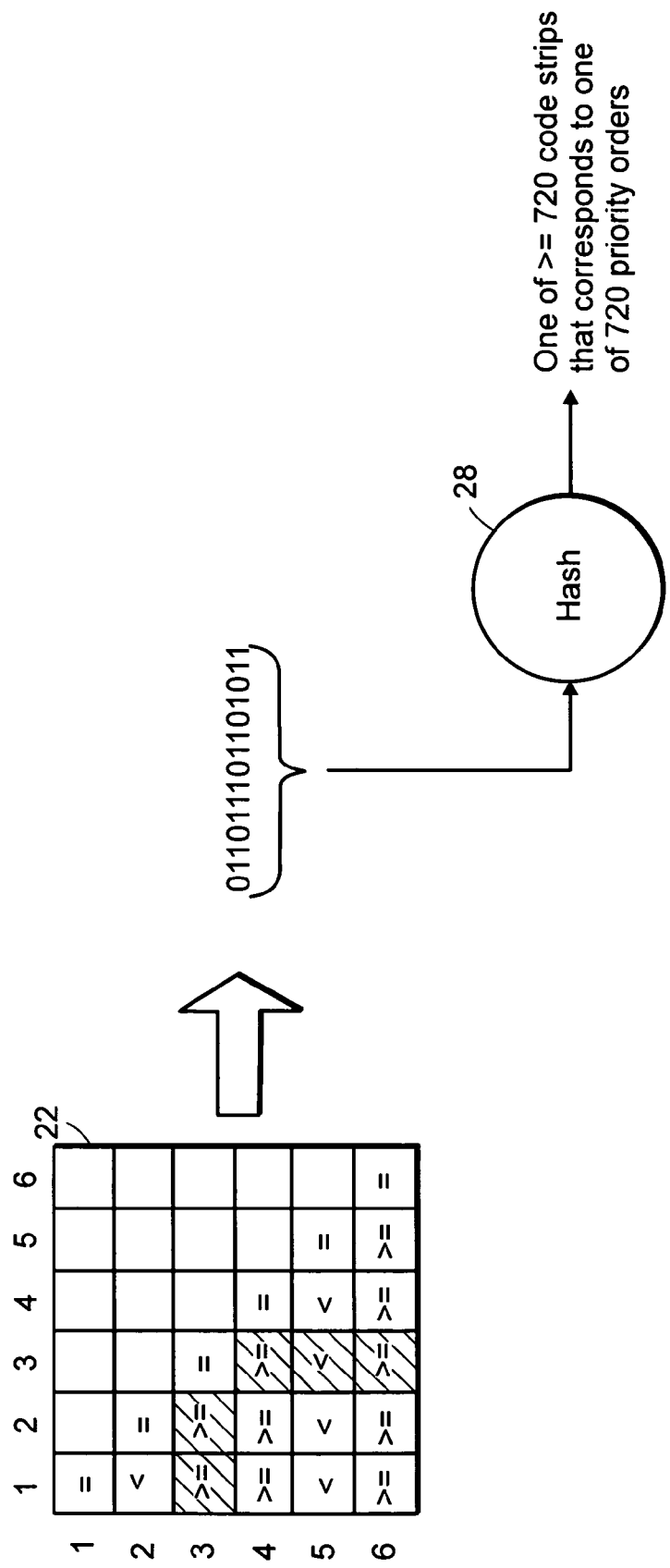
FIG. 5 illustrates a hashing embodiment of the invention.

An example of hashing to generate a code strip index into a jump table is shown in FIG. 5. In this case, the address bits are passed through a hash function 28 that reduces the number of bits to a smaller number of bits that can then act as a code strip index or address a smaller lookup table.

Another method to reduce the lookup table size is to break the address into two or more sub-addresses, where each sub-address is a fixed subset of the entire address. Ideally, each sub-address is fully dense, that is, all possible combinations of its bits are valid. If a sub-address is fully dense, then a lookup table addressed by that sub-address will be fully populated and thus will not waste any entries. Any single row or column within the sorting matrix will generate a sub-address that is fully dense, since a row or column are relative priorities relative to a single queue. Thus, every possible combination of those sub-address bits are possible, since there are no additional relative priorities to force additional ordering due to the transitive property where X<Y and Y<Z, that implies X<Z. Additional relative priority bits will eventually create such transitive property relationships that then disallow some of the possible combinations of the remaining address bits.

The result of that first lookup along with the remaining unused bits from the sorting matrix can then be used to select the actual permutation. Note that the address used by second lookup table will probably be more complicated than a straight lookup using the remaining address bits to further compress those tables. The first lookup table may request some function to be applied to the remaining address bits to further reduce the size of the second lookup table or to help select the appropriate second lookup table.

Figure 6:
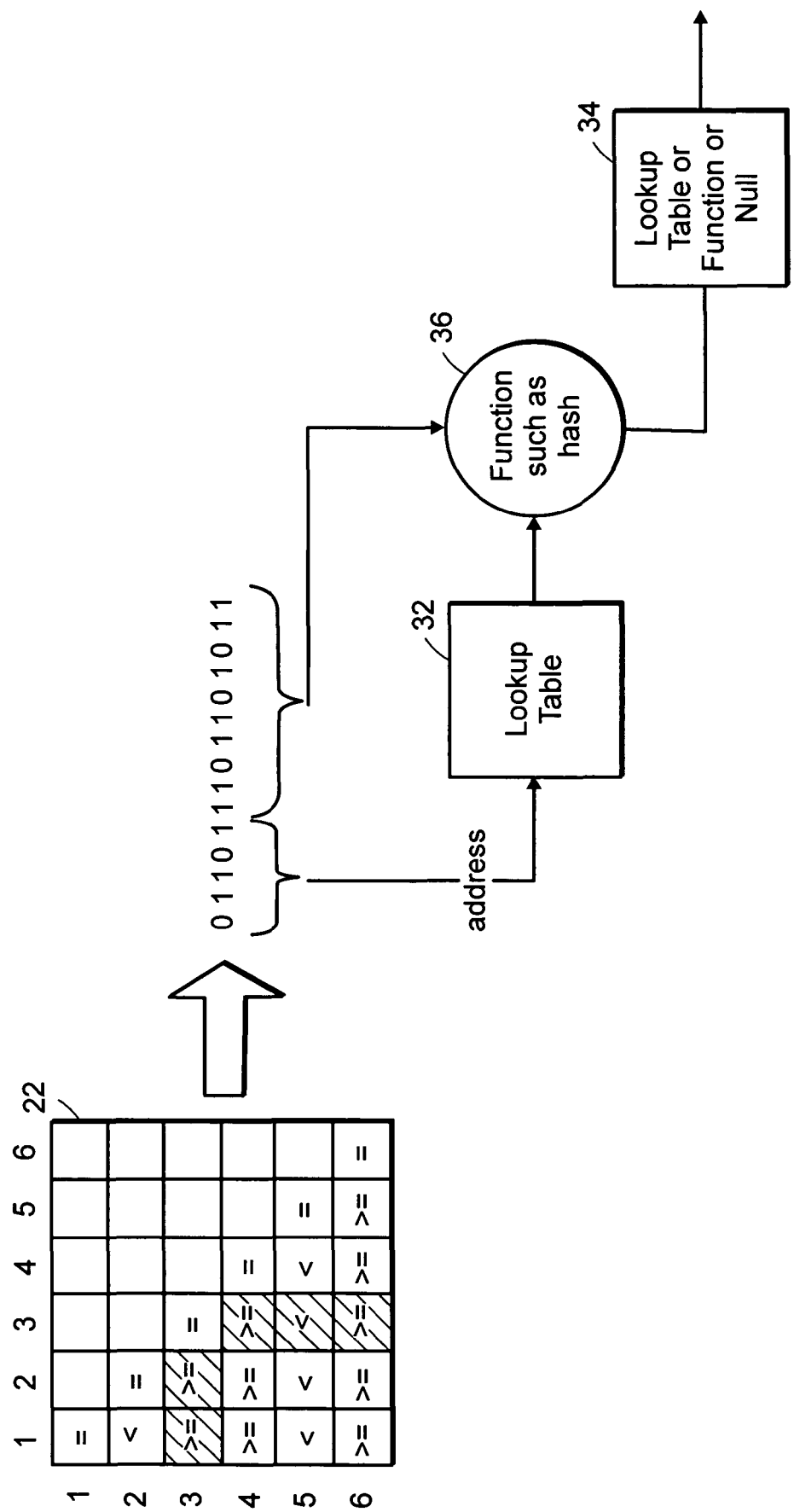
FIG. 6 illustrates a multi-staged embodiment of the invention.

An example that continues our previous six queue example is shown in FIG. 6. We use the first 5 b from column 1 to create an address that is used as an address to a first lookup table 32. The result of that lookup is combined with the remaining ten bits of address to select the actual permutation. If the result of the first lookup is a pointer to a 1024 entry table that is addressed by the remaining ten bits, no space is saved. However, the second tables 34 can, for the most part be extremely compressed either using the hash 36 of the hashing scheme described before or various other techniques such as specifying which bits of the address can actually vary and only using those bits rather than all ten.

These state reduction schemes can be used with sorting schemes other than the sorting matrix, such as generating a base N number using the priority-ordered resources as the coefficients. In this scheme, the resources are each given unique integer names from 0 to N−1, where N is the number of resources. The highest priority resource's number is used as the coefficient to the $N^{N-1}$ term, the second highest priority resource's number is used as the coefficient to the $N^{N-2}$ term and so on. For example, in a three queue system, a priority queue might specify the priority order 2, 1, 3 (represented as 1, 0, 2 to be 0 offset). A unique index can be generated as follows:

$$1N^2 + 0N^1 + 2N^0$$

Where N is 3, the number of queues. This method will generate a unique integer that will uniquely identify the priority order of the three queues.

Jump Table Reduction

A standard jump table will have one table entry per possible code strip that will have the queue polling order imbedded into it. For example, the pseudo-code of the [6, 4, 3, 1, 2, 5] priority order looks like this

```
Priority_order_6_4_3_1_2_5:
    Poll queue 6. If packet available forward and return
    Poll queue 4. If packet available forward and return
    Poll queue 3. If packet available forward and return
    Poll queue 1. If packet available forward and return
    Poll queue 2. If packet available forward and return
    Poll queue 5. If packet available forward and return
    return
```

The index read by the lookup is used to jump to the specific code strip (block) that polls in the correct order.

In our example of 6 queues, there are 6!=720 possible code strips, a number that is too large for some network processors. We can reduce the number of code strips by a factor of N (in this case 6) by simply noticing that groups of N of the priority orderings are simply rotations of each other. For example, ordering [6, 4, 3, 1, 2, 5] is a rotation of [4, 3, 1, 2, 5, 6], [3, 1, 2, 5, 6, 4], [1, 2, 5, 6, 4, 3], [2, 5, 6, 4, 3, 1], [5, 6, 4, 3, 1, 2], and [6, 4, 3, 1, 2, 5]. This reduction requires duplicating N−1 of the polls within the code strip but will reduce the amount of code substantially. In this case, there are N entrance points into the strip.

Thus, for our original example

```
Priority_order_4_3_1_2_5_6:
    Poll queue 4. If packet available forward and return
Priority_order_3_1_2_5_6_4:
    Poll queue 3. If packet available forward and return
Priority_order_1_2_5_6_4_3:
    Poll queue 1. If packet available forward and return
Priority_order_2_5_6_4_3_1:
    Poll queue 2. If packet available forward and return
Priority_order_5_6_4_3_1_2:
    Poll queue 5. If packet available forward and return
Priority_order_6_4_3_1_2_5:
    Poll queue 6. If packet available forward and return
    Poll queue 4. If packet available forward and return
    Poll queue 3. If packet available forward and return
    Poll queue 1. If packet available forward and return
    Poll queue 2. If packet available forward and return
    Poll queue 5. If packet available forward and return
    Return
```

It can be seen that the original block of code for priority order 6, 4, 3, 1, 2, 5 is expanded by duplicating five of the code elements of that strip at the beginning of the block of code. For example, the code element for polling Queue 4 is duplicated at the beginning of the code block as are the code elements for polling Queues 3, 1, 2 and 5. The entrance into the jump table is to any one of six entrance points depending on the priority order.

In the original scheme, we would require 720 possibilities*6 poll operations in each possibility resulting in 4320 total poll operations. In the new scheme, we result in 720/6* (11 poll operations)=1320 poll operations, a savings of almost a factor of four poll operations.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of processing in accordance with a priority sort comprising:
   providing plural instruction code blocks within a jump table, each one of the plural instruction code blocks comprising instruction code elements arranged to process sort elements in an order specified by a priority order of the sort elements, wherein the instruction code blocks are free of branches;
   maintaining relative priority of each sort element individually relative to each other sort element;
   with change in a sort element, revising the relative priority of that changed sort element relative to other sort elements;
   generating an address based on the relative priorities of the sort elements;
   processing the address to create an index into the jump table; and with the index, indexing to one of the plural instruction code block, within the jump table, comprising the instruction code elements arranged to process the sort elements in an order specified by the relative priorities of the sort elements.

2. A method as claimed in claim 1 wherein processing the address includes addressing a lookup table to create the index into the jump table.

3. A method as claimed in claim 2 wherein processing the address further includes hashing the address and using the results of the hash to address the lookup table.

4. A method as claimed in claim 2 wherein the lookup table is addressed by less than all of the relative priorities, and the output of the lookup table and additional relative priorities are further processed to address the instruction code blocks.

5. A method as claimed in claim 2 wherein the instruction code blocks process sort elements in a priority order and duplicate code that processes select ones of said sort elements, and each of multiple entry points in a instruction code block is specified by a set of relative priorities.

6. A method as claimed in claim 1 further comprising hashing the relative priorities to address the instruction code blocks.

7. A method as claimed in claim 6 wherein less than all of the relative priorities are applied to a hash function and the output of the hash function is further processed with additional relative priorities.

8. A method as claimed in claim 1 wherein specifying the priority order further comprises addressing a lookup table by less than all of the relative priorities and further processing the output of the lookup table and additional relative priorities.

9. A method as claimed in claim 1 wherein the instruction code blocks process sort elements in a priority order and duplicate code that processes select ones of said sort elements, and each of multiple entry points in the instruction code blocks is specified by a set of relative priorities.

10. A method as claimed in claim 1 further comprising hashing the relative priorities to specify the priority order.

11. A method as claimed in claim 1 further comprising addressing a lookup table by less than all of the relative priorities, the output of the lookup table and additional relative priorities being further processed to specify the priority order.

12. A method as claimed in claim 1 wherein the sort elements are queues.

13. A method as claimed in claim 12 wherein the priorities are based on queue sizes.

14. A method as claimed in claim 1 wherein the relative priorities are maintained in a sorting matrix.

15. A processor for sorting sort elements comprising:
memory that provides a plurality of instruction code blocks within a jump table, each one of the plural instruction code blocks comprising instruction code elements arranged to process sort elements in an order specified by a priority order of the sort elements, and that maintains relative priority of each sort element individually relative to each other sort element, wherein the instruction code blocks are free of branches;
a priority processor that compares a priority value of a changed sort element with a priority value of each other sort element to store in memory the relative priority of that changed sort element relative to each other sort element and that generates an address based on the relative priorities of the sort elements and that processes the address to create an index into the jump table; and
with the index, indexing to one of the plural instruction code block, within the jump table, comprising the instruction code elements arranged to process the sort elements in an order specified by the relative priorities of the sort elements.

16. A processor as claimed in claim 15 wherein the instruction code blocks process sort elements in a priority order and duplicate code that processes select ones of said sort elements, and each of multiple entry points in the instruction code blocks is specified by a set of relative priorities.

17. A network device comprising:
a plurality of queues;
memory that provides a plurality of instruction code blocks within a jump table, each one of the plural instruction code blocks comprising instruction code elements arranged to process sort elements in an order specified by a priority order of the sort elements, and that maintains relative priority of each queue individually relative to each other queue, wherein the instruction code blocks are free of branches;
a priority processor that compares a priority value of a changed queue with a priority value of each other queue to store in memory the relative priority of that changed queue relative to each other queue and that generates an address based on the relative priorities of the queues and that processes the address to create an index into the jump table; and
with the index, indexing to one of the plural instruction code blocks, within the jump table, comprising the instruction code elements arranged to process the sort elements in an order specified by the relative priorities of the sort elements.

18. A method of processing in accordance with a priority sort comprising:
providing plural instruction code blocks within a jump table, each one of the plural instruction code blocks comprising instruction code elements arranged to process sort elements in an order specified by a priority order of the sort elements, wherein the instruction code blocks are free of branches;
maintaining relative priority of each sort element individually relative to each other sort element, each sort element being a queue;
with change in a queue, revising the relative priority of that changed queue relative to other queues;
generating an address based on the relative priorities of the queues;
processing the address to create an index into the jump table; and
with the index, indexing to one of the plural instruction code blocks, within the jump table, comprising the instruction code elements arranged to process the sort elements in an order specified by the relative priorities of the sort elements.

19. The method of claim 18 wherein the relative priorities are maintained in a sorting matrix.

* * * * *